US006260038B1

(12) United States Patent
Martin et al.

(10) Patent No.: US 6,260,038 B1
(45) Date of Patent: Jul. 10, 2001

(54) CLUSTERING MIXED ATTRIBUTE PATTERNS

(75) Inventors: David C. Martin; Dharmendra Shantilal Modha; Shivakumar Vaithyanathan, all of San Jose, CA (US)

(73) Assignee: International Businemss Machines Corporation, Armonk, NY (US)

( * ) Notice: Subject to any disclaimer, the term of this patent is extended or adjusted under 35 U.S.C. 154(b) by 0 days.

(21) Appl. No.: 09/394,883

(22) Filed: Sep. 13, 1999

(51) Int. Cl.[7] ........................................ G06F 17/30
(52) U.S. Cl. ................. 707/7; 707/2; 707/5; 707/6; 707/101; 707/102
(58) Field of Search .................... 707/7, 6, 101, 707/2, 5, 102

(56) References Cited

U.S. PATENT DOCUMENTS

| 5,271,097 | * | 12/1993 | Barker et al. | 395/135 |
|---|---|---|---|---|
| 5,448,727 | | 9/1995 | Annevelink | 707/101 |
| 5,471,567 | * | 11/1995 | Soderberg et al. | 395/133 |
| 5,983,220 | * | 11/1999 | Schmitt | 707/5 |
| 6,012,058 | * | 1/2000 | Fayyad et al. | 707/6 |
| 6,029,195 | * | 2/2000 | Herz | 709/219 |
| 6,032,146 | * | 2/2000 | Chadha et al. | 707/6 |
| 6,038,574 | * | 3/2000 | Pitkow et al. | 707/513 |
| 6,049,797 | * | 4/2000 | Guha et al. | 707/6 |
| 6,115,708 | * | 9/2000 | Fayyad et al. | 707/6 |

OTHER PUBLICATIONS

Chaudhuri et al., "A novel multiseed nonhierarchical data clustring technique", IEEE, vol. 27, No. 5, pp. 871–877, Oct. 1997.*

Burd et al., "Investigating component based maintenance and the effect of software evolution: a reeingineering approach using data clustering", IEEE, pp. 199–206, Jan. 1997.*

Liu et al., "Feature selection via discretization", IEEE, vol. 9, No. 4, pp. 642–645, Jul. 1997.*

J. C. Gower, "A General Coefficient of Similarity and Some of its Properties," Biometrics 27, 857–874, Dec. 1971.

H. Ralambondrainy, "A conceptual version of the K–means algorithm, " Pattern Recognition Letters 16, 1995 pp. 1147–1157.

M. Berger et al., "An Algorithm for Point Clustering and Grid Generation," IEEE Transactions on Systems, Man, and Cybernetics, vol. 21, No. 5, 1991, pp. 1278–1286.

D.H. Fisher, "Knowledge Acquistion Via Incremental Conceptual Clustering," Jul. 4, 1987, pp. 267–283.

J. MacQueen, "Some Method for Classification and Analysis of Multivariate Observations," pp. 281–297.

(List continued on next page.)

Primary Examiner—Hosain T. Alam
Assistant Examiner—Jean M Corrielus
(74) Attorney, Agent, or Firm—Khanh Q. Tran, Esq.; Banner & Witcoff, Ltd.

(57) ABSTRACT

A technique for clustering data points in a data set that is arranged as a matrix having n objects and m attributes. Each categorical attribute of the data set is converted to a 1-of-p representation of the categorical attribute. A converted data set A is formed based on the data set and the 1-of-p representation for each categorical attribute. The converted data set A is compressed using, for example, a Goal Directed Projection compression technique or a Singular Value Decomposition compression technique, to obtain q basis vectors, with q being defined to be at least m+1. The transformed data set is projected onto the q basis vectors to form a data matrix having at least one vector, with each vector having q dimensions. Lastly, a clustering technique is performed on the data matrix having vectors having q dimensions.

30 Claims, 6 Drawing Sheets

OTHER PUBLICATIONS

R.S. Michalski, "Chapter 4: A Theory and Methodology of Inductive Learning," Maching Learning: An Artificial Intelligent Approach, Springer, New York,. pp. 83–134.

Duda and Hart, "Pattern Classification and Scene Analysis," New York: Wiley, 1973, pp. 210–257.

M. Ester et al, "A Database Interface for Clustering in Large Spatial Databases," Conference on Knowledge Disclovery and Data, pp. 94–99.

S.Z. Selim et al., "K–Means–Type Algorithms: A Generalized Convergence Theorem and Characterization of Local Optimality,", IEEE Transactios on Pattern Analysis and Machine Intelligence, vol. PAM1–6, No. 1, Jan. 1984, pp. 81–87.

Z. Huang, "*A Fast Clustering Algorithm to Cluster Very Large Categorical Data Sets in Data Mining,*" pp/ 1–8.

Eui–Hong Han et al., "Clustering Based on Association Rule Hypergraphs," pp. 9–13.

U.M. Fayyad et al., "Conceptual Clustering in Structured Databases: a Practical Approach," KDD–95 Proceedings, pp. 180–185.

R.T. Ng et al., "Efficient and Effective Clustering Methods for Spatial Data Mining," Proceedings of the 20th VLDB Conference, Santiago, Chile, 1994, pp. 144–155.

S. D. Lee et al, "Maintenance of Discovered Association Rules: What to update?" pp. 51–58.

T. Zhang et al., "Birch: An Efficient Data Clustering Method for Very Large Databases," SIGMOD '96, Jun. 1996, pp. 103–114.

S.W. Wharton, "A generalized Histogram Clustering Scheme for Multidimensional Image Data," Pattern Recognition, vol. 16, No. 2, 1983, pp. 193–199.

B. Ripley, "Pattern Recognition and Neural Networks," Cambridge University Press, 1996, pp. 311–322.

Raghavan et al., "Latent Semantic Indexing: A Probabilistic Analysis," 1998, pp. 1–15.

M. Zaït et al, "A Comparative Study of Clustering," pp. 1–12.

* cited by examiner

| $a_1$ | α |
|---|---|
| $a_2$ | β |
| $a_3$ | γ |
| $a_4$ | θ |
| $a_5$ | σ |
| $a_6$ | β |
| $a_7$ | θ |

*FIG. 1*

|  | α | β | γ | θ | σ |
|---|---|---|---|---|---|
| $a_1$ | 1 | 0 | 0 | 0 | 0 |
| $a_2$ | 0 | 1 | 0 | 0 | 0 |
| $a_3$ | 0 | 0 | 1 | 0 | 0 |
| $a_4$ | 0 | 0 | 0 | 1 | 0 |
| $a_5$ | 0 | 0 | 0 | 0 | 1 |
| $a_6$ | 0 | 1 | 0 | 0 | 0 |
| $a_7$ | 0 | 0 | 0 | 1 | 0 |

*FIG. 2*

30
```
┌─────────────────────────────────┐
│ CONVERT CATEGORICAL ATTRIBUTES OF│
│ DATA SET TO 1-OF-P REPRESENTATION│
│               31                 │
└─────────────────────────────────┘
              ↓
┌─────────────────────────────────┐
│ CONVERT 1-OF-P REPRESENTATION   │
│ MATRIX TO MATRIX HAVING NUMERIC │
│ ATTRIBUTES BY GDP COMPRESSION   │
│ OR SVD COMPRESSION              │
│               32                │
└─────────────────────────────────┘
              ↓
┌─────────────────────────────────┐
│ CLUSTER CONVERTED DATA SET USING│
│ CLUSTERING ALGORITHM            │
│               33                │
└─────────────────────────────────┘
```

FIG. 3

40
```
┌─────────────────────────────────┐
│ CONVERT BINARY ATTRIBUTE (1-OF-2)│
│ INTO MATRIX HAVING NUMERIC      │
│ ATTRIBUTES BY GDP COMPRESSION   │
│ OR SVD COMPRESSION              │
│               41                │
└─────────────────────────────────┘
              ↓
┌─────────────────────────────────┐
│ CLUSTER CONVERTED DATA SET USING│
│ CLUSTERING ALGORITHM            │
│               42                │
└─────────────────────────────────┘
```

FIG. 4

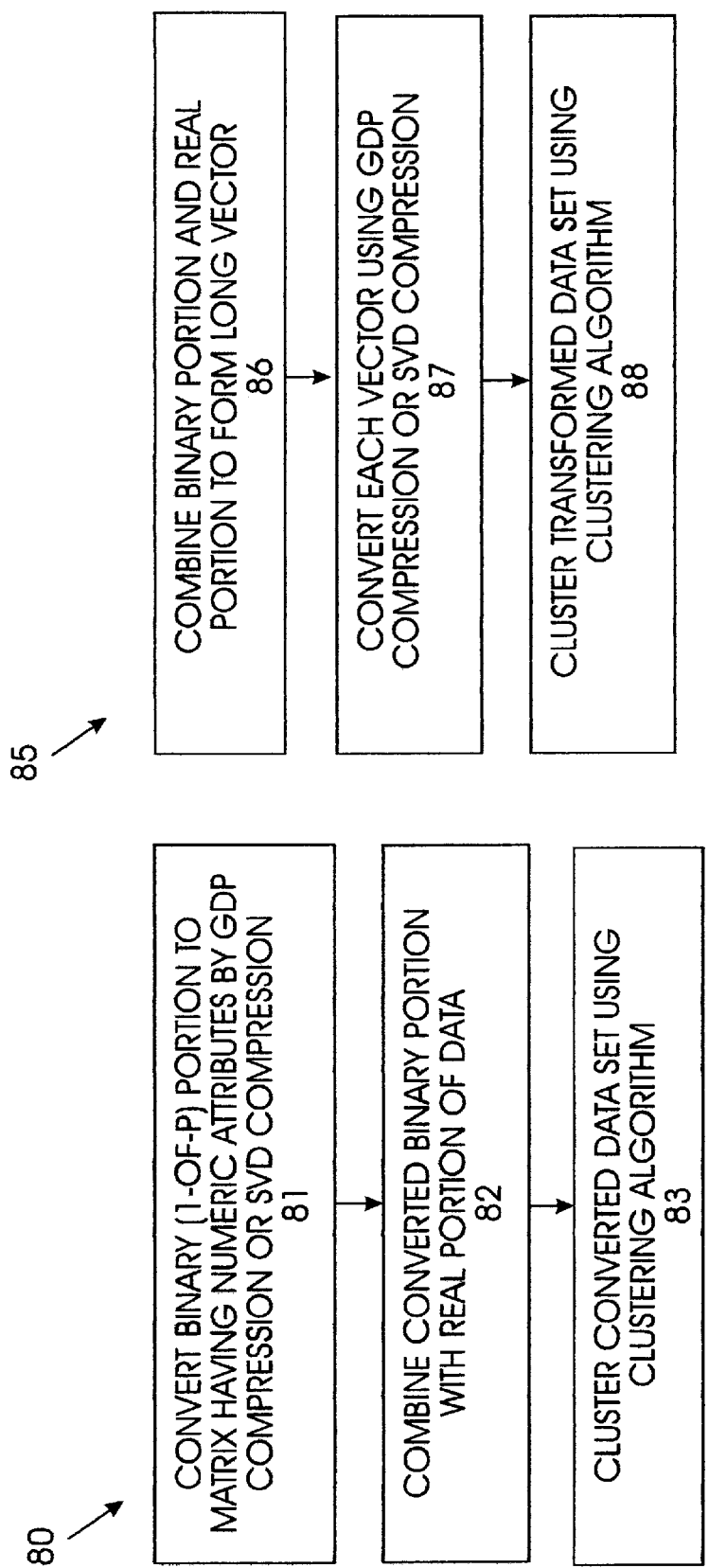

CLUSTERING MIXED ATTRIBUTE PATTERNS

BACKGROUND OF THE INVENTION

1. Field of the Invention

The present invention relates to the field of data processing. More particularly, the present invention relates to a method and apparatus for clustering data points in a data set having mixed attributes or features.

2. Description of the Related Art

Conventional data clustering techniques perform well when all of the data points of a data set contain the same type of attributes or features. That is, all data points of the data set have only one type of attribute, such as categorical, binary or real data (numeric, continuous) attributes. Conventional data clustering techniques, such as the k-medians, k-prototype and k-means algorithms, breakdown when a data set has mixed-mode attributes, such as attributes that are a combination of categorical, binary and/or real data attributes.

The k-medians clustering algorithm is designed for clustering data having categorical attributes, but not for data having mixed attributes. The k-prototype algorithm does not handle mixed attributes directly, but uses a tuneable parameter for combining attribute types. Nevertheless, the k-prototype algorithm produces less than optimal results than for data having purely categorical attributes.

H. Ralambondarainy discloses a data clustering technique for converting data having categorical attributes to 1-of-p representations that are then combined with data of the same data set having real attributes. The combined 1-of-p representations and real attributes are used directly in a clustering algorithm, such as the k-means algorithm.

The other conventional techniques for clustering categorical attributes are either hierarchical algorithms or conceptual clustering algorithms. The hierarchical algorithms are $O(n^2)$, where n is the number of data points, and, consequently, are too computationally intensive for large data sets. The conceptual clustering algorithms are not particularly useful for numeric attributes, particularly when the data is noisy.

What is needed is an efficient way for clustering data points having mixed attributes whether the attributes are categorical, binary and/or real data attributes.

SUMMARY OF THE INVENTION

The present invention provides an efficient way for clustering data points having mixed attributes whether the attributes are categorical, binary and/or real data attributes. The advantages of the present invention are provided by a method for clustering data points in a data set that is arranged as a matrix having n objects and m attributes. Each categorical attribute of the data set is converted to a 1-of-p representation of the categorical attribute. A converted data set A is formed based on the data set and the 1-of-p representation for each categorical attribute.

The converted data set A is compressed using, for example, a Goal Directed Projection (GDP) compression technique or a Singular Value Decomposition (SVD) compression technique, to obtain q basis vectors, with q being defined to be at least m+1. The transformed data set is projected onto the q basis vectors to form a data matrix, with each vector having q dimensions. Lastly, a clustering technique is performed on the data matrix having vectors having q dimensions.

According to the invention, the step of compressing the converted data set preferably includes the steps of partitioning the objects of the converted data set, or a sample of the objects of the converted data set, into k cohesive groups using a k-means clustering technique or an expectation maximization (EM) technique, with k being less than m, and computing a distance from each object to a centroid of each group. Accordingly, when the k-means technique is used, the distance measure can be defined to be, for example, a Euclidean metric, a city-block metric or a cosine similarity metric. Further, the distance from each data point to the centroid of each group can use a different distance measure for each prototype vector.

The present invention also provides that the step of compressing the converted data set can include subtracting a mean of the converted data set from each object of the converted data set, partitioning the objects into k cohesive groups, with k being less than m, and computing a distance from each object to a centroid of each group.

When the data set includes at least one attribute having a categorical portion and a corresponding real portion, the step of converting each categorical attribute includes separating the categorical portion of each respective attribute from the corresponding real portion of the attribute, and converting the categorical portion of each attribute to a 1-of-p representation. For this situation, the step of compressing the converted data set A compresses the converted categorical portion of each attribute. Then, each vector having q dimensions is combined with the associated real portion of each attribute before the transformed data set is projected. Consequently, the step of performing the clustering technique is performed on a data matrix resulting from the combination of each vector having q dimensions with the corresponding real portion of each attribute.

In the situation when the data set includes at least one attribute having a categorical portion and a corresponding real portion, the step of converting each categorical attribute includes separating the categorical portion of each respective attribute from the corresponding real portion of the attribute, converting the categorical portion of each respective attribute to a 1-of-p representation, and combining the 1-of-p representation of the categorical portion and the corresponding real portion of each respective attribute. In this situation, the combined categorical Iof-p representation of the categorical portion and the corresponding real portion of each respective attribute are compressed.

BRIEF DESCRIPTION OF THE DRAWING

The present invention is illustrated by way of example and not limitation in the accompanying figures in which like reference numerals indicate similar elements and in which:

FIG. 1 shows a matrix having several objects each having a categorical attribute that has a plurality of potential values;

FIG. 2 shows a matrix in which the objects shown in FIG. 1 have been converted to a 1-of-p representation prior to processing according to the present invention;

FIG. 3 shows a flow diagram for clustering data having only categorical attributes according to the present invention.

FIG. 4 shows a flow diagram for clustering data having only binary attributes according to the present invention;

FIGS. 8a and 8b show a flow diagrams for alternative approaches for clustering data having a combination of binary and real attributes according to the present invention.

DETAILED DESCRIPTION

Figure 5:
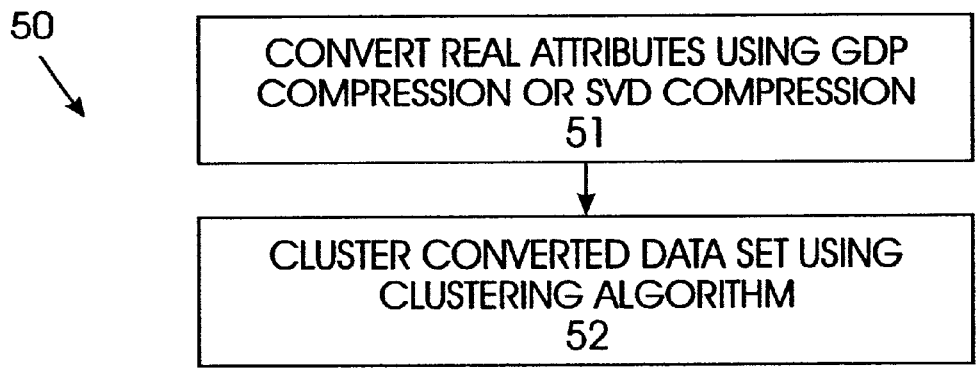
FIG. 5 shows a flow diagram for clustering data having only real attributes according to the present invention.

The data clustering technique of the present invention can directly process data having mixed attributes, thus simplifying processes, such as data visualization, data mining and data summarization, for data having any combination of categorical and mixed attributes using cluster prototypes and non-geometrical prototypes of the data. The data clustering technique of the present invention can also be used for clustering a data set having only categorical attributes, only binary attributes, only real attributes, a combination of categorical and binary attributes, a combination of categorical and real attributes, a combination of categorical, binary and real attributes, and a combination of binary and real attributes.

The following description of the present invention is based on an original set of data having n objects and m attributes, and which is organized into an n×m matrix denoted as A[n][m].

According to the invention, the types of attributes, or features, contained in data set matrix A[n][m] are initially identified. Each respective categorical attribute of A[n][m] is converted, or expanded, into a 1-of-p representation so that each data point having a categorical attribute essentially becomes an expanded vector. That is, each respective categorical attribute of A[n][m] is converted into multiple attributes by representing each modality a categorical attribute as a separate attribute. To illustrate this, FIG. 1 shows several objects $a_1$–$a_7$ each having a categorical attribute having a modality of 5: $\alpha$, $\beta$, $\gamma$, $\theta$ and $\sigma$. FIG. 2 shows objects $a_1$–$a_7$ converted to a 1-of-p representation in which a binary value "1" represents the existence of a modality of the original categorical attribute, and a binary value "0" represents nonexistence of a modality.

A binary attribute in data set A[n][m] is a special case of a categorical attribute having a modality of 2. Consequently, data having binary attributes do not need to be transformed to a 1-of-p representation. Further, real attributes contained in A[n][m] also require no conversion to a 1-of-p representation.

Data having a combination of categorical, binary and/or real attributes are recombined after the categorical attributes have been expanded, and the resulting 1-of-k representation matrix is essentially the data matrix A[n][m] having expanded attributes. An under-determined matrix, by definition, occurs when the expanded number of attributes is greater than the number of objects. Similarly, an over-determined matrix, by definition, occurs when the expanded number of attributes is fewer than the number of objects.

While converting data having a categorical attribute to a 1-of-p representation generally increases the number of attributes associated with a data set, each expanded vector becomes a sparse vector. That is, each vector resulting from the 1-of-k representation expansion has only one modality of the expanded categorical attribute having a value of "1", while the other attributes for the expanded categorical attribute have a value of "0".

The converted, or expanded, data set matrix A is then compressed using a compression technique, such as, preferably the Goal Directed Projection (GDP) compression algorithm, for transforming the converted data set matrix A to be within a real space, and for reducing the dimensionality of the data set. Alternatively, the Singular Value Decomposition (SVD) compression algorithm can be used for transforming the converted data set matrix A to be with a real space and for dimensionality reduction. The GDP compression technique differs from the SVD and by obtaining centroids of data groups instead of eigenvectors for the groups through computationally intensive techniques. The resulting centroids approximate eigenvectors obtained by SVD or PCA compression techniques, but are obtained much more rapidly by being less computationally intensive.

For GDP compression, the converted data set is partitioned into k cohesive groups using a well-known clustering algorithm or matrix reordering technique. The centroid for each group is then computed using a well-known clustering algorithm, such as the k-means algorithm. The computed centroid is then defined to be an axis for projection. According to the invention, either the entire converted data set, or a sample of the data set, can be partitioned into k cohesive groups for computing the centroids. The k groups are preferably selected so that the within-group scatter is minimized, while the between-group scatter is maximized.

Each computed centroid becomes an axis for projection for the entire data set. For example, a data set can be divided row-wise into k groups for obtaining directions for projections for the rows. Similarly, a data set can be divided column-wise into k groups for obtaining directions of projection for the columns.

At this stage, the data is available in a matrix format. At step 32, the data points are grouped into k clusters, or segments, using any well-known data clustering algorithm, such as, the k-means algorithm or an expectation maximization technique, so that the original matrix is divided into k disjoint segments. Both the k-means algorithm and the EM algorithm produce k prototype vectors that correspond to each of the identified k-segments. The number of prototype vectors k can be selected using a variety of well-known heuristics, such as the MDL principle. Additionally, the k-means algorithm can be performed using any of a variety of different distance measures, such as a Euclidean ($L^2$) metric, a city-block metric or a cosine similarity (or inner product) metric.

Once the k prototype vectors have been computed, the distance of each data point in the data set to each of the respective k prototypes is computed at step 33 using any well-known distance measure for producing a vector having k attributes. Exemplary distance measures that can be used are the Euclidean metric, the city-block metric or the cosine similarity metric. A different distance measure can be used for each prototype vector. Thus, there may be as many as k different distance measures used in a single projection step.

As a result, each data point in the data set has a reduced dimensional representation by having only k attributes, with k being less than or equal to the number of original attributes. In effect, a data matrix results that has the same number of rows as the original data matrix, but having a fewer number of columns.

Consider, for example, a data matrix A having n rows (data points) and m columns (attributes). Pre-clustering and projection can be applied to either matrix A or to the transpose A' of matrix A. To reduce the dimensionality of A, the number of data points is kept fixed, while the number of attributes is reduced. In contrast, to reduce the dimensionality of A', the number of attributes is kept fixed, while the number of data points is reduced.

Using the GDP compression algorithm, the dimensionality of matrix A is reduced to obtain, for example, a matrix B. Similarly, the dimensionality of matrix B' can be reduced to obtain a matrix C.

Returning to the mixed attribute clustering technique of the present invention, when the converted data set matrix A is either over-determined or underdetermined, GDP compression can be performed on basically three types of matrices: the original data matrix A, a data matrix in which the mean of the data set has been subtracted from each data point of the data set, or a data matrix in which the mean of the data set has been subtracted from each data point of the data set and then each data point is divided by the variance of the data set. This is corresponds to performing eigenvector decomposition on a sum-squared of products matrix, a covariant matrix or a correlation matrix of the data set. A sum-squared of products matrix is $A^T A$, where $A^T$ is the transpose of the expanded-attribute matrix A. The covariant matrix is formed by first scaling matrix the expanded-attribute matrix A by subtracting the mean of each column from the elements in each respective column, then by computing $A^T A$. The correlation matrix is formed by first scaling the expanded-attribute matrix A by subtracting the mean of each column from the elements in each respective column, dividing the elements of each column by the variance of the column, and then by computing $A^T A$.

The principal "q" eigenvectors resulting from the compression are retained. For over-determined matrices, however, the first eigenvector is typically ignored. Preferably, the number of eigenvectors q is defined to be p=m+1, where m is the number of attributes in the original data set. The converted data matrix is then projected onto the "q" principal eigenvectors.

At this point, a well-known clustering technique, such as the k-means clustering algorithm, is performed on the transformed data set matrix A, and each cluster member is interpreted within its original domain.

FIG. 3 shows a flow diagram 30 for clustering data having only categorical attributes according to the present invention. At step 31, the categorical attributes of the data set are converted and a 1-of-p representation matrix is formed. At step 32, the 1-of-p representation matrix is then converted into a matrix having numeric attributes by converting the 1-of-p representation matrix by using GDP compression or SVD compression. At step 33, the converted data set is clustered using a clustering algorithm, such as the k-means clustering algorithm.

FIG. 4 shows a flow diagram 40 for clustering data having only binary attributes according to the present invention. As previously mentioned, a binary attribute is a special case of a categorical attribute having a modality of 2. Thus, a data set having only binary attributes is already in a 1-of-p representation format. At step 41, the 1-of-p representation matrix is then converted into a matrix having numeric attributes by converting the 1-of-p representation matrix by using GDP compression or SVD compression. At step 42, the converted data set is clustered using a clustering algorithm.

FIG. 5 shows a flow diagram 50 for clustering data having only real attributes according to the present invention. At step 51, the data set matrix is converted by using GDP compression or SVD compression. At step 52, the transformed data set is clustered using a clustering algorithm.

Figure 6:
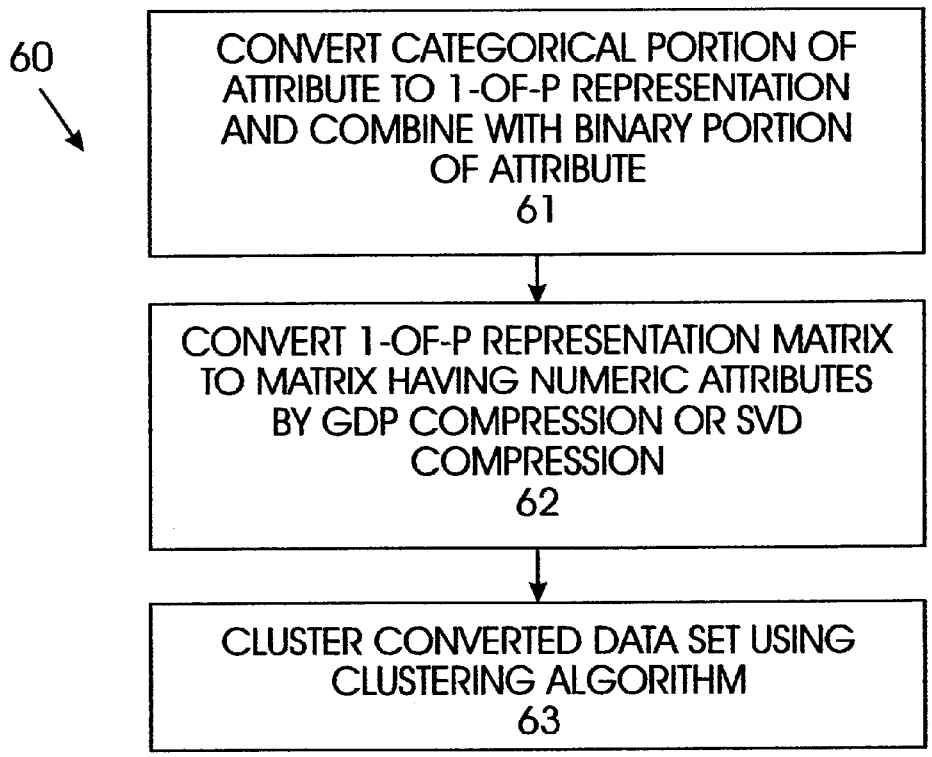
FIG. 6 shows a flow diagram for clustering data having a combination of categorical and binary attributes according to the present invention.

FIG. 6 shows a flow diagram 60 for clustering data having a combination of categorical and binary attributes according to the present invention. At step 61, the categorical portion of the data is converted to a 1-of-p representation and then combined with the corresponding binary portion of the data to form a 1-of-p representation matrix of expanded vectors. At step 62, the 1-of-p representation matrix is converted into a matrix having numeric attributes by using either GDP compression or SVD compression. At step 63, the converted data set is clustered using a clustering algorithm.

Figures 7A, 7B:
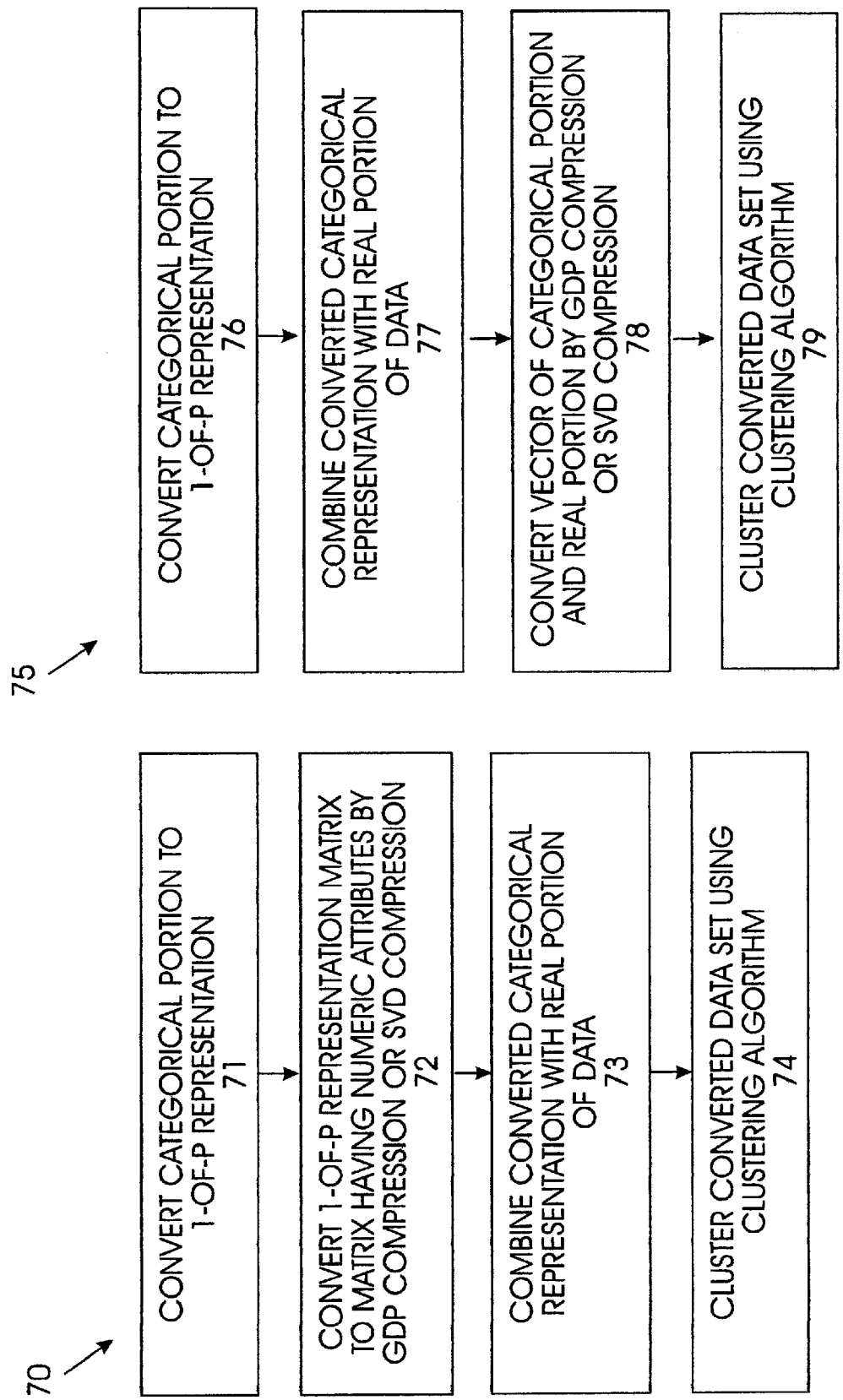
FIGS. 7a and 7b show flow diagrams for alternative approaches for clustering data having a combination of categorical and real attributes according to the present invention.

FIGS. 7a and 7b show flow diagrams for alternative approaches for clustering data having a combination of categorical and real attributes according to the present invention. FIG. 7a shows a flow diagram 70 for a first approach for clustering data having a combination of categorical and real attributes according to the present invention. At step 71, the categorical portion of each data point is converted into a 1-of-p representation. Then, at step 72 the 1-of-p representation matrix is converted into a matrix having numeric attributes by converting the 1-of-p representation matrix in real by GDP compression or SVD compression. At step 73, the lower-dimensional representation of the categorical portion of the data is combined with the real part into one long vector before clustering the converted data set at step 74 using a clustering algorithm.

FIG. 7b shows a flow diagram 75 for a second approach for clustering data having a combination of categorical and real attributes. For the second approach, the categorical portion of each data point is converted into a 1-of-p representation at step 76. At step 77, the converted categorical portion of each data point is combined with the corresponding real portion of the data point to form one long vector for the data point. At step 78, each long vector is converted into a lower-dimensional space using either GDP compression or SVD compression. Lastly, at step 79 the converted data set is clustered using a clustering algorithm.

FIGS. 8a and 8b show a flow diagrams for alternative approaches for clustering data having a combination of binary and real attributes according to the present invention. FIG. 8a shows a flow diagram 80 for the first approach for clustering data having a combination of binary and real attributes according to the present invention. At step 81 the binary portion (1-of-p representation) of each data point is converted into a matrix having numeric attributes by inverting the 1-of-p representation matrix in real by GDP compression or SVD compression. At step 82, the lower-dimensional representation of the binary portion of the data is combined with the real part into one long vector before clustering the converted data set at step 83 using a clustering algorithm.

FIG. 8b shows a flow diagram 85 for the second approach for clustering data having a combination of binary and real attributes. For the second approach, the binary portion and the real portion of each data point basically form one long vector for the data point at step 86. At step 87, each long vector is converted into a lower-dimensional space using either GDP compression or SVD compression. Lastly, at step 88 the converted data set is clustered using a clustering algorithm.

Figure 9:
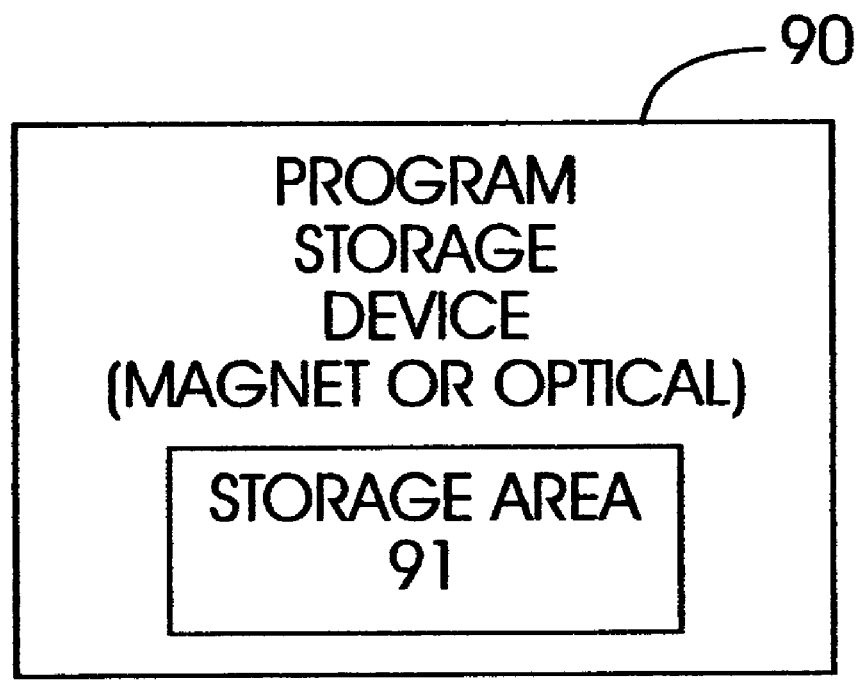
FIG. 9 shows a program storage device having a storage area for storing a machine readable program of instructions that are executable by the machine for performing the method of the present invention for clustering data having attribute patterns that are a combination of binary and real attributes and/or for reducing the dimensionality of a data set.

FIG. 9 shows a program storage device 90 having a storage area 91. Information stored in storage area 91 in a well-known manner that is readable by a machine, and that tangibly embodies a program of instructions executable by the machine for performing the method of the present invention described herein for clustering data having mixed attribute patterns and/or for reducing the dimensionality of a data set. Program storage device 90 can be a magnetically recordable medium device, such as a magnetic diskette or hard drive, or an optically recordable medium device, such as an optical disk.

While the present invention has been described in connection with the illustrated embodiments, it will be appreciated and understood that modifications may be made without departing from the true spirit and scope of the invention.

What is claimed is:

1. A method performed by a computer for clustering data points in a data set, the data set being arranged as a matrix having n objects and m attributes, the method comprising the steps of:
    converting each categorical attribute of the data set to a 1-of-p representation of the categorical attribute;
    forming a converted data set A based on the data set and the 1-of-p representation for each categorical attribute;
    compressing the converted data set A to obtain q basis vectors, with q being defined to be at least m+1;
    projecting the converted data set onto the q basis vectors to form a data matrix having at least one vector, each vector having q dimensions; and
    performing a clustering technique on the data matrix having vectors having q dimensions.

2. The method according to claim 1, wherein the step of compressing uses a Goal Directed Projection compression technique.

3. The method according to claim 1, wherein the step of compressing uses a Singular Value Decomposition compression technique.

4. The method according to claim 1, wherein the step of compressing the converted data set includes the steps of:
    partitioning the objects into k cohesive groups, with k being less than m; and
    computing a distance from each object to a centroid of each group.

5. The method according to claim 4, wherein the step of partitioning uses a k-means technique for clustering the data points of the converted data set.

6. The method according to claim 5, wherein the k-means techique uses one of a Euclidean metric, a city-block metric and a cosine similarity metric for a distance measure.

7. The method according to claim 5, wherein the step of clustering uses an expectation maximization clustering technique.

8. The method according to claim 5, wherein the step of partitioning uses a sample of the converted data set.

9. The method according to claim 5, wherein the step of computing the distance from each data point to the centroid of each group uses a different distance measure for each prototype vector.

10. The method according to claim 1, wherein the step of compressing the converted data set includes the steps of:
    subtracting a mean of the converted data set from each object of the converted data set;
    partitioning the objects into k cohesive groups, with k being less than m; and
    computing a distance from each object to a centroid of each group.

11. The method according to claim 1, wherein the data set includes at least one attribute having a categorical portion and a corresponding real portion,
    wherein the step of converting each categorical attribute includes the steps of:
        separating the categorical portion of each respective attribute from the corresponding real portion of the attribute, and
        converting the categorical portion of each attribute to a 1-of-p representation,
    wherein the step of compressing the converted data set A compresses the converted categorical portion of each attribute,
    the method further comprising the step of combining each vector having q dimensions with the associated real portion of each attribute before the step of projecting the converted data set, and
    wherein the step of performing the clustering technique is performed on a data matrix resulting from the step of combining each vector having q dimensions with the corresponding real portion of each attribute.

12. The method according to claim 1, wherein the data set includes at least one attribute having a categorical portion and a corresponding real portion,
    wherein the step of converting each categorical attribute includes the steps of:
        separating the categorical portion of each respective attribute from the corresponding real portion of the attribute,
        converting the categorical portion of each respective attribute to a 1-of-p representation, and
        combining the 1-of-p representation of the categorical portion and the corresponding real portion of each respective attribute, and
    wherein the step of compressing the converted data set A compresses the combined categorical 1-of-p representation of the categorical portion and the corresponding real portion of each respective attribute.

13. The method according to claim 1, further comprising a step of computer visualizing the data points of the clustered data matrix set based on selected attributes of the data set.

14. The method according to claim 1, further comprising a step of computer mining the data points of the clustered data matrix based on selected attributes of the data set.

15. The method according to claim 1, further comprising a step of computer summarizing the clustered data matrix based on selected attributes of the data set.

16. A program storage device comprising:
    a storage area; and
    information stored in the storage area, the information being readable by a machine, and tangibly embodying a program of instructions executable by the machine for performing method steps comprising:
        converting each categorical attribute of a data set to a 1-of-p representation of the categorical attribute, the data set being arranged as a matrix having n objects and m attributes;
        forming a converted data set A based on the data set and the 1-of-p representation for each categorical attribute;
        compressing the converted data set A to obtain q basis vectors, with q being defined to be at least m+1;
        projecting the converted data set onto the q basis vectors to form a data matrix having at least one vector, each vector having q dimensions; and
        performing a clustering technique on the data matrix having vectors having q dimensions.

17. The program storage device according to claim 16, wherein the step of compressing uses a Goal Directed Projection compression technique.

18. The program storage device according to claim 16, wherein the step of compressing uses a Singular Value Decomposition compression technique.

19. The program storage device according to claim 16, wherein the step of compressing the converted data set includes the steps of:
   partitioning the objects into k cohesive groups, with k being less than m; and
   computing a distance from each object to a centroid of each group.

20. The program storage device according to claim 19, wherein the step of partitioning uses a k-means technique for clustering the data points of the converted data set.

21. The program storage device according to claim 20, wherein the k-means technique uses one of a Euclidean metric, a city-block metric and a cosine similarity metric for a distance measure.

22. The program storage device according to claim 20, wherein the step of clustering uses an expectation maximization clustering technique.

23. The program storage device according to claim 20, wherein the step of partitioning uses a sample of the converted data set.

24. The program storage device according to claim 20, wherein the step of computing the distance from each data point to the centroid of each group uses a different distance measure for each prototype vector.

25. The program storage according to claim 16, wherein the step of compressing the converted data set includes the steps of:
   subtracting a mean of the converted data set from each object of the converted data set;
   partitioning the objects into k cohesive groups, with k being less than m; and
   computing a distance from each object to a centroid of each group.

26. The program storage device according to claim 16, wherein the data set includes at least one attribute having a categorical portion and a corresponding real portion,
   wherein the step of converting each categorical attribute includes the steps of:
      separating the categorical portion of each respective attribute from the corresponding real portion of the attribute, and
      converting the categorical portion of each attribute to a 1-of-p representation,
   wherein the step of compressing the converted data set A compresses the converted categorical portion of each attribute,
   the method further comprising the step of combining each vector having p dimensions with the associated real portion of each attribute before the step of projecting the transformed data set, and
   wherein the step of performing the clustering technique is performed on a data matrix resulting from the step of combining each vector having q dimensions with the corresponding real portion of each attribute.

27. The program storage device according to claim 16, wherein the data set includes at least one attribute having a categorical portion and a corresponding real portion,
   wherein the step of converting each categorical attribute includes the steps of:
      separating the categorical portion of each respective attribute from the corresponding real portion of the attribute,
      converting the categorical portion of each respective attribute to a 1-of-p representation, and
      combining the 1-of-p representation of the categorical portion and the corresponding real portion of each respective attribute, and
   wherein the step of compressing the converted data set A compresses the combined categorical 1-of-p representation of the categorical portion and the corresponding real portion of each respective attribute.

28. The program storage device according to claim 16, further comprising a step of computer visualizing the data points of the data set based on selected attributes of the data set.

29. The program storage device according to claim 16, further comprising a step of computer mining the data points of the clustered data matrix based on selected attributes of the data set.

30. The program storage device according to claim 16, further comprising a step of computer summarizing the clustered data matrix based on selected attributes of the data set.

* * * * *

UNITED STATES PATENT AND TRADEMARK OFFICE
CERTIFICATE OF CORRECTION

PATENT NO. : 6,260,038 B1
DATED : July 10, 2001
INVENTOR(S) : David C. Martin et al.

It is certified that error appears in the above-identified patent and that said Letters Patent is hereby corrected as shown below:

Title page,
Item [73], Assignee, "Businemss" has been replaced with -- Business --.
Item [56], References Cited, U.S. PATENT DOCUMENTS, "Jan. 1997" has been replaced with -- Jan. 1998 --

Column 8,
Line 50, insert -- for clustering data points in a data set, the method steps -- after "steps".

Signed and Sealed this

Twelfth Day of November, 2002

*Attest:*

JAMES E. ROGAN
*Director of the United States Patent and Trademark Office*

*Attesting Officer*